(12) United States Patent
van der Woude

(10) Patent No.: US 7,560,838 B2
(45) Date of Patent: Jul. 14, 2009

(54) GENERATOR FOR AN ENGINE

(75) Inventor: Matthijs van der Woude, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 152 days.

(21) Appl. No.: 11/528,602

(22) Filed: Sep. 28, 2006

(65) Prior Publication Data

US 2007/0085429 A1 Apr. 19, 2007

(30) Foreign Application Priority Data

Oct. 17, 2005 (DE) .................... 10 2005 049 879

(51) Int. Cl.
*H02K 1/32* (2006.01)
(52) U.S. Cl. ........................................ 310/64
(58) Field of Classification Search ................ 310/64, 310/113, 114, 118
See application file for complete search history.

(56) References Cited

U.S. PATENT DOCUMENTS

| | | | |
|---|---|---|---|
| 2,794,930 A | 6/1957 | Rieser | |
| 3,742,264 A | 6/1973 | Anderson | |
| 4,286,187 A | 8/1981 | Binder | |
| 5,796,190 A * | 8/1998 | Takeda et al. | 310/58 |
| 6,114,784 A * | 9/2000 | Nakano | 310/59 |
| 6,710,482 B2 | 3/2004 | Mackulin | |
| 7,042,121 B2 * | 5/2006 | De Filippis et al. | 310/63 |

FOREIGN PATENT DOCUMENTS

| | | |
|---|---|---|
| AT | 1 51 891 B | 12/1937 |
| DE | 23 33 385 A | 1/1974 |
| DE | 28 16 180 A1 | 10/1979 |
| DE | 201 11 265 U1 | 11/2001 |
| EP | 12 89 099 A2 | 3/2003 |
| JP | 08 019215 A | 1/1996 |
| WO | WO 88/06371 | 8/1988 |

OTHER PUBLICATIONS

Patent Abstracts of Japan, 08 0 19 215 A, Jan. 1996, Takemoto Haruki.

* cited by examiner

*Primary Examiner*—Nguyen N Hanh
(74) *Attorney, Agent, or Firm*—Timothy J. Klima

(57) ABSTRACT

A generator housing (1) of an engine generator is connected to a gearbox casing (17) via a cover plate (23) that bears the rotor shaft (5). The cover plate has a two-piece design and includes a bearing retainer ring (13) for a rotor shaft bearing (11) made of a rigid material and fastened only to the gearbox casing, and a heat-conducting ring (21) connected with both the gearbox casing and the generator housing. A centering cylinder (18) molded to the bearing retainer ring centers the generator housing and thus the stator (3) and rotor (4) while a spacer ring (20) and/or an adjustable spacer ring (10) ensure the exact axial positioning of the rotor or bearing retainer ring. The generator of this design is safe to operate and has a long service life.

20 Claims, 4 Drawing Sheets

(12)United States Patent

GENERATOR FOR AN ENGINE

This application claims priority to German Patent Application DE 10 2005 049 879.5 filed Oct. 17, 2005, the entirety of which is incorporated by reference herein.

BACKGROUND OF THE INVENTION

The invention relates to a generator for an engine having a generator housing that houses a stator and rotor, and a cover plate that includes a bearing for the rotor shaft and is flanged to a gearbox casing.

Generators flanged to the gearbox casing via a cover plate have been known for a long time but they cause problems because the functioning of the generator is adversely affected and its service life significantly reduced by the considerable quantity of heat produced by its rotor and stator. Engineers have tried to solve this problem by improving heat dissipation from the generator housing via its cover plate to the gearbox casing, in that the cover plate was made of a material with high thermal conductivity, like the aluminum alloy used here, so that the heat can be dissipated from the generator housing (that is also made of an aluminum alloy) via the cover plate into the gearbox casing.

The rotor shaft is typically supported by a steel ball bearing that is integrated into the cover plate. If the cover plate involves two materials with different heat conductivities, there is the disadvantage that the steel bearing of the rotor shaft cannot be incorporated firmly enough into the aluminum cover plate, since the two materials differ in thermal expansion. As the aluminum cover plate shows comparatively little stiffness and does not meet the dynamic requirements of high rotor speeds and a durably stable seat of the bearing in the cover plate, the bearing of the rotor shaft does not have a long service life. An insert made of a high-strength and rigid material such as a titanium alloy must be used in the cover plate. An increased clearance can result between the shell of the bearing and the casing results in jams and vibrations, which eventually damages the bearing, the stator and the rotor.

The proposal to make the entire cover plate of a high-strength material such as steel or titanium has solved the problem described above and represents today's state of the art. However, this results in comparatively poor heat conductivity and excessive operating temperatures of the generator stator, leading to increased failure rates of these generators. The proposal to create as large a heat transfer surface as possible by making the cover plate large-volume is doomed to failure as this increases the volume and weight of the cover plate, the latter effect being particularly undesirable in aircraft engines. Cooling fins on the generator housing would be an excellent alternative solution for heat dissipation in normal operating conditions but fail here because in the event of a fire a greater heat input with unchanged poor thermal conductivity towards the gearbox will result in early generator failure, which prevents it from meeting the five-minute minimum functionality requirement in the event of a fire to supply power to the electronic control module and overspeed protection unit for safe engine shutdown.

It is an object of this invention to design a generator flanged to the gearbox casing of an engine in such a way that it ensures an exactly centered bearing of the rotor shaft and exact alignment of the rotor with the stator while as great a heat quantity as possible is dissipated from the stator housing for a long service life of the generator.

DESCRIPTION OF THE INVENTION

This object is achieved according to the invention by a generator designed according to the characteristics described herein and its coupling to the gearbox casing. Advantageous improvements and useful aspects of the invention are described below.

The major characteristic of the invention is a two-piece design of the cover plate that encloses the generator and is flanged to the gearbox casing, said cover plate having a bearing retainer ring that is only screwed to the rotor shaft and the gearbox casing and made of a high-strength rigid material, and a separate heat-conducting ring connected both to the gearbox casing and to the generator housing made of a highly heat-conductive material. As the heat is separately conducted directly to the gearbox casing and the rotor shaft is supported separately in a bearing retainer ring only connected to the gearbox casing and made of a poorly heat-conductive, stiff material, operationally safe centered bearing of the rotor shaft and the rotor in the stator is ensured regardless of any movements caused by heat, and the generator can be operated without stator overheating so that a long service life can be achieved.

This provides an opportunity to rework existing components such as the bearing retainer ring or to continue to use the existing stator, thereby reducing the expenses of optimizing the connection of the generator to the gearbox casing.

In another embodiment of the invention, a centering cylinder pointing towards the generator is molded to the bearing retainer ring. This cylinder tightly surrounds the peripheral surface of the generator housing and causes exact centering of the rotor in the stator. The purely radial sealing is less sensitive to varying component heights of the bearing retainer ring and the heat-conducting ring and allows greater manufacturing tolerances with regard to the heights of the heat-conducting ring and the bearing retainer ring.

The bearing retainer ring can be connected to the gearbox casing via a spacer ring to ensure tightness and correct axial arrangement of the centering cylinder to the generator housing or of the rotor to the stator. Spacer rings of various thicknesses are provided that guarantee the proper setting accuracy.

The bearing retainer ring is screwed to the gearbox casing using fastening eyes. As the heat-conducting ring encompasses the bearing retainer ring at a relatively narrow spacing and is in contact with the gearbox casing, two recesses are molded into the edge of the heat-conducting ring that points towards the gearbox casing, and the fastening eyes engage in these recesses.

According to yet another characteristic of the invention, the rotor is supported at its front end by a jacket that encompasses the rotor shaft, preferably via an adjustable spacer ring that is available in various thicknesses to ensure exact axial alignment of the rotor with the stator.

In yet another embodiment of the invention, the heat-conducting ring can be connected to the bearing retainer ring by some type of fit.

Finally the heat-conducting ring can also be directly molded to the generator housing, and in this case the centering ring of the bearing retainer ring with its circumferential groove and inserted O-ring acts against the inner surface of the generator housing extended by the heat-conducting ring. In this application, the generator housing has a direct thermal connection with the gearbox while at the same time the more rigid material required for optimum support is utilized. This makes it possible to keep the number of components low for any new design, to apply greater dimensional tolerances to the manufacturing of the centering cylinder of the bearing retainer ring, and to limit axial rotor orientation towards the stator to the selection of an adjustable spacer ring that is available in various thicknesses and placed between the rotor front end and the collar that encompasses the rotor shaft.

Embodiments of the invention are explained in greater detail with reference to the figures, wherein.

Figure 1:
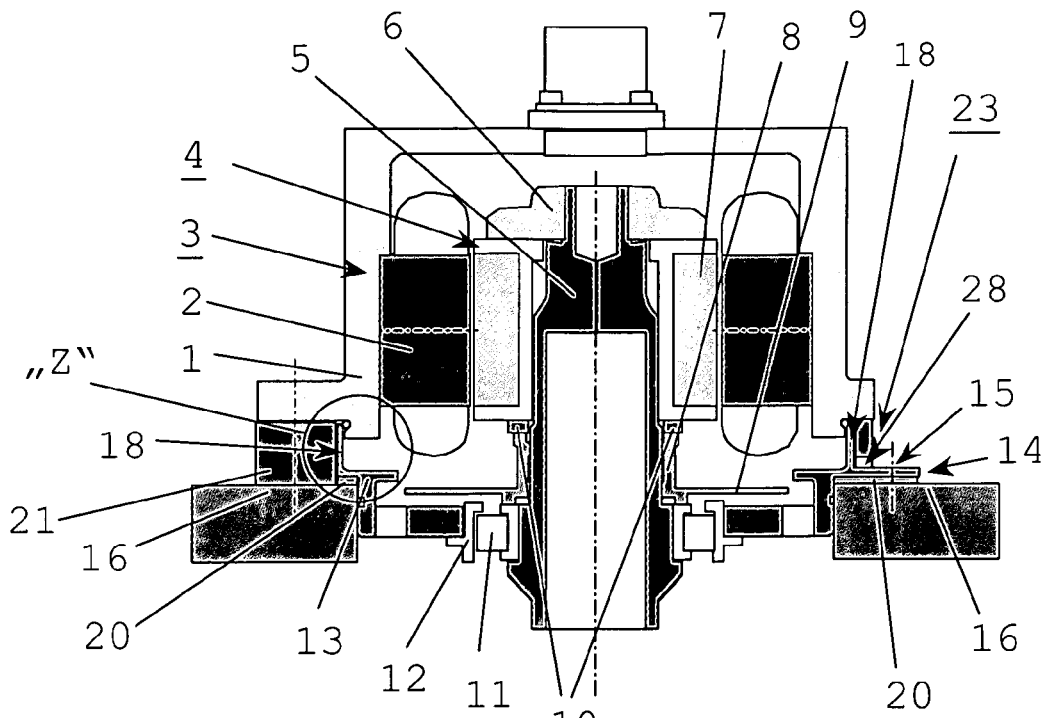
FIG. 1 shows a diagrammatic sectional view of a magneto-electric generator flanged to the gearbox casing of an engine in which the heat-conducting ring and the bearing retainer ring are independently connected to the gearbox casing in a clearance fit.
Figure 2:
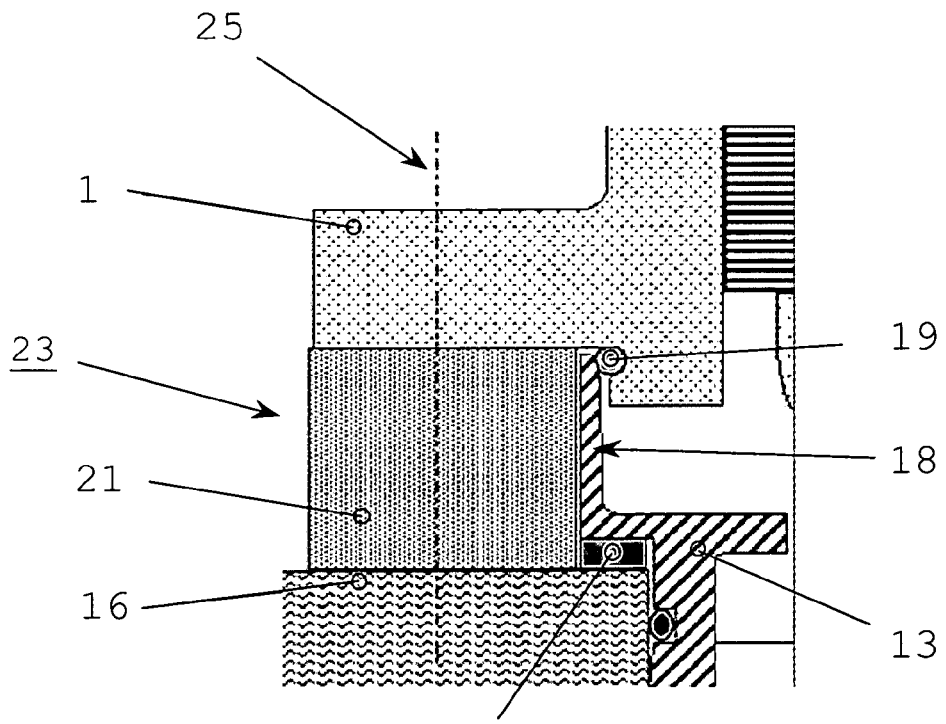
FIG. 2 shows a detail "Z" of the view shown in FIG. 1.

As shown in the Figures, the magneto-electric generator includes a generator housing 1, a stator 3 mounted to its inner wall and comprising induction coils 2, and a rotor 4 equipped with permanent magnets 7 that is held on a rotor shaft 5 using a fastening nut 6. An oil splasher disk 9 is attached to the rotor shaft 5 using a jacket 8 connected to it. The rotor 4 is supported axially at the front end of the jacket 8 that points towards the generator housing 1. The front end of the rotor is supported by the jacket 8 using a first adjustable spacer ring 10 that is set to a specific thickness. Adjustable spacer rings 10 are available at various thicknesses for exact axial alignment of the rotor 4 with the stator 3.

Figure 3:
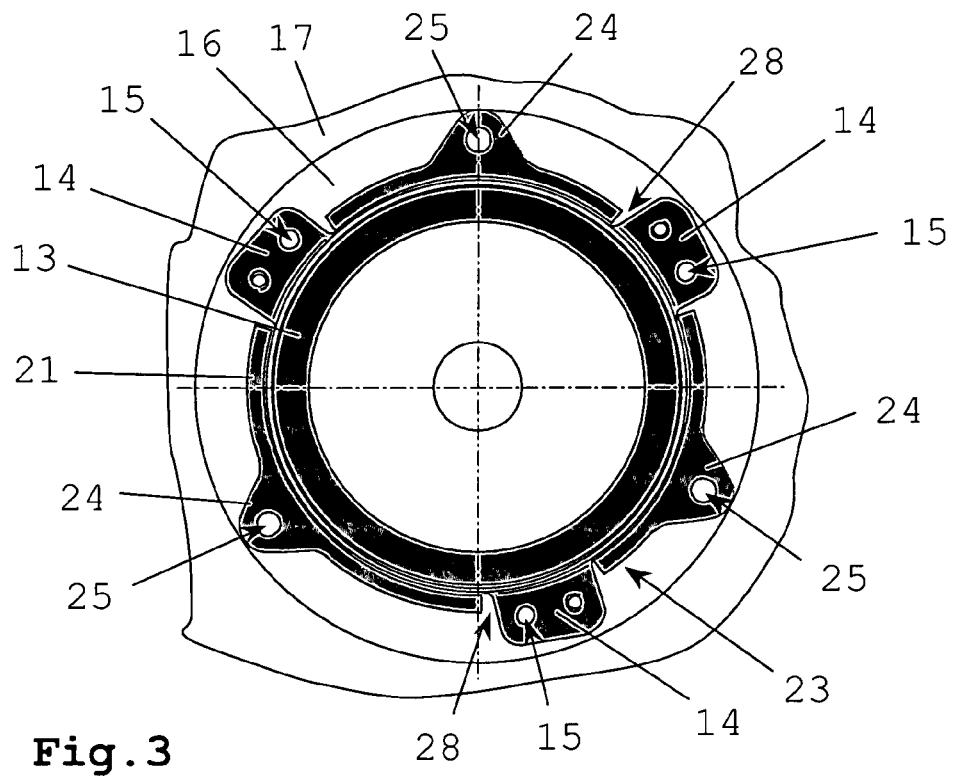
FIG. 3 shows a sectional view of the two-piece cover plate with the respective mounting links for its fastening to the gearbox casing.
Figure 4:
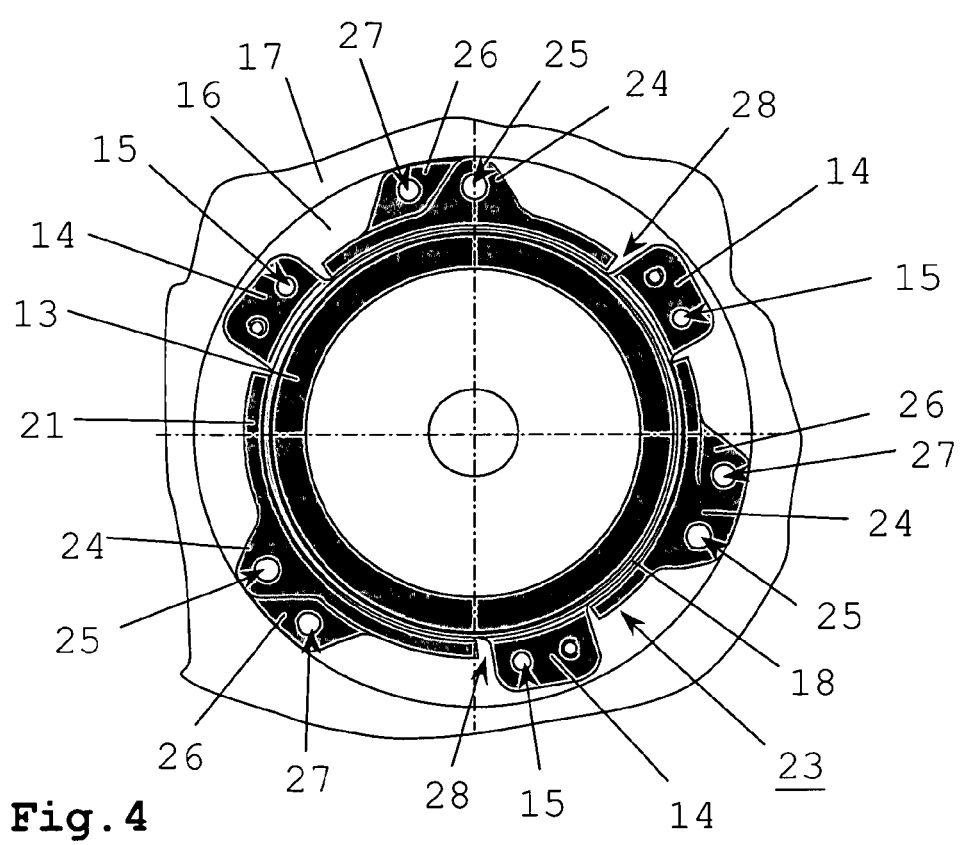
FIG. 4 shows a view according to FIG. 3 in which the heat-conducting ring of the cover plate has its own mounting link.

An antifriction bearing 11 whose outer bearing shell 12 is attached to a bearing retainer ring 13 made of a titanium alloy, a rigid but poorly heat-conductive material, is provided for supporting the rotor shaft 5. As can be seen in FIGS. 3 and 4, the bearing retainer ring 13 comprises fastening eyes 14 with holes 15 to firmly join the bearing retainer ring 13 with a gearbox casing flange 16 of the gearbox casing 17 (see FIGS. 3 and 4) using stud bolts (not shown).

A centering cylinder 18 that stretches in axial direction towards the stator is molded onto the bearing retainer ring 13, and an O-ring 19 on its inner surface holds a peripheral surface of the cylindrical generator housing 1 (FIGS. 1 and 5) to effect an exact centered position of the rotor 4 in the stator 3 and thus an even clearance width, thereby ensuring precise operation and a long service life of the generator. The front side or lateral surface of the centering cylinder 18 does not contact the generator housing 1. The front-end distance of the centering cylinder 18 from the generator housing 1 is set using a second spacer ring 20 (FIGS. 1 and 7) with the required thickness to ensure correct positional arrangement of the O-ring 19 between the centering cylinder 18 and the generator housing 1.

The outer surface of the centering cylinder 18 of the bearing retainer ring 13 is encompassed by a heat-conducting ring 21 made of a highly heat-conductive material, in one embodiment, an aluminum alloy. The heat-conducting ring 21 is in contact with both the generator housing 1 and the gearbox casing flange 16 of the gearbox casing 17 so that the heat of the generator housing 1 is dissipated towards the gearbox casing 17, thereby ensuring trouble-free operation and a long service life of the magneto-electric generator. The heat-conducting ring 21 is fastened between generator housing 1 and gearbox casing 17 using mounting links 24 molded to the heat-conducting ring 21 and associated first mounting holes 25 (FIG. 3).

As FIG. 4 shows, fastening links 26 with second mounting holes 27 may also be molded onto the heat-conducting ring 21 for additional fastening of the heat-conducting ring 21 to the gearbox casing 17, completely independent of the generator housing 1. This is to prevent the heat-conducting ring 21 from accidentally falling down during disassembly. Recesses 28 for the fastening eyes 14 of the bearing retainer ring 13 fastened independently to the gearbox casing 17 or gearbox casing flange 16, respectively, are located on the lower edge of the heat-conducting ring 21 that points towards the gearbox casing 17.

In this way, the bearing retainer ring 13 with centering cylinder 18 and heat-conductive ring 21 form a joint two-piece cover plate 23 that is mounted between the generator housing 1 and gearbox casing 17 and that ensures good heat dissipation from the generator housing 1 to the gearbox casing 17 and dynamically stable support in the bearing retainer ring 13 made of a stiffer material, as well as centered and axially exact alignment of the rotor 4 with the stator 3.

The heat-conducting ring 21 and the bearing retainer ring 13 with centering cylinder 18 are independently connected to the gearbox casing 17. Positioning and alignment of the bearing retainer ring 13 and the rotor 4 with the stator 3 are not influenced by the different expansion behavior of heat-conducting ring 21 and bearing retainer ring 13 as the rotor shaft 5 that is radially supported on both sides is axially guided by the interaction of rotor 4 and stator 3 as produced by a magnetic field and can compensate small relative movements of the two components in axial direction.

Figure 5:
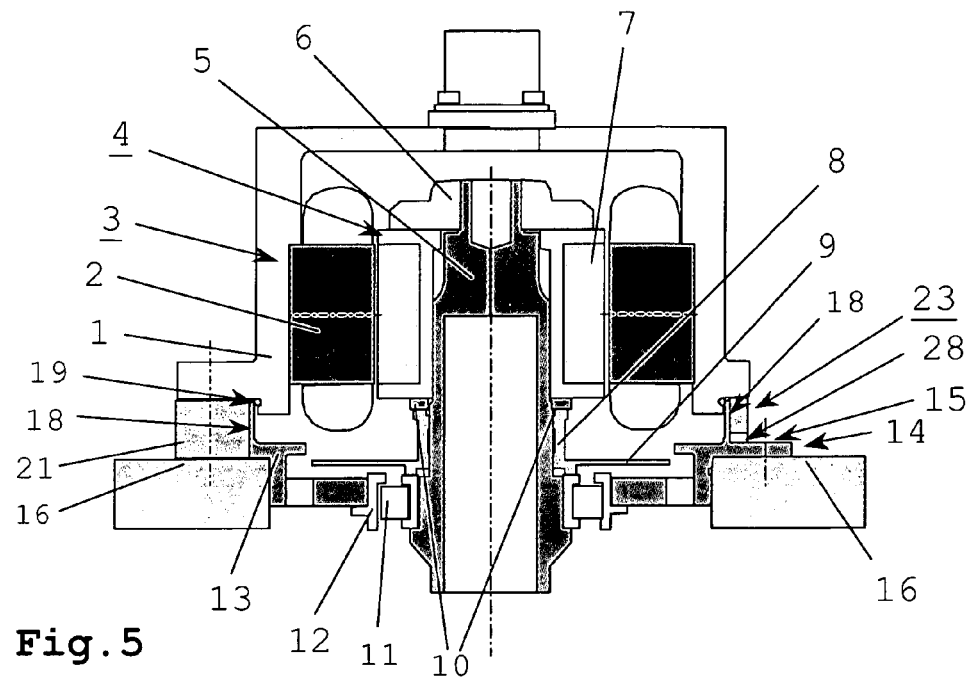
FIG. 5 shows a view of the magneto-electric generator in which the heat-conducting ring and the bearing retainer ring are joined in a drive fit and the parallel contact surfaces of the cover plate are manufactured jointly as a unit.

According to FIGS. 1 to 4, the bearing retainer ring 13 and the heat-conducting ring 21 are two separate components, i.e. with a clearance between each other. It is also conceivable, however, that—as shown in FIG. 5—the bearing retainer ring 13 and the heat-conducting ring 21 are joined in a drive fit. As the alignment of the bearing retainer ring 13 with the heat-conducting ring 21 is defined by the drive fit, there is no need for the spacer ring 20 that is used to set the front-end position of the centering cylinder 18 or the O-ring.

Figure 6:
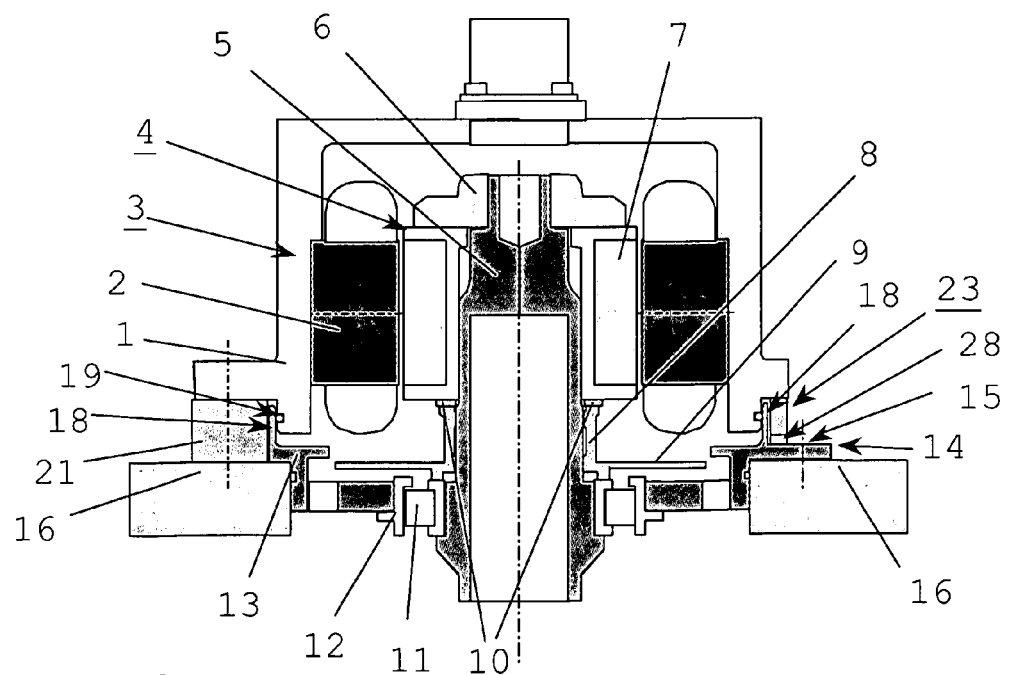
FIG. 6 shows a view of the magneto-electric generator with a radial seal between the generator housing and the bearing retainer ring.

The spacer ring 20 is also dispensable if the O-ring 19—unlike in FIGS. 1 and 5—is arranged in such a way that it forms a radial seal between the centering cylinder 18 and an inner peripheral surface of the generator housing 1 as shown in FIG. 6. Exact axial positioning of the centering cylinder 18 is not important here as the exact axial alignment of the rotor with the stator can be set using the adjustable spacer ring 10.

Figure 7:
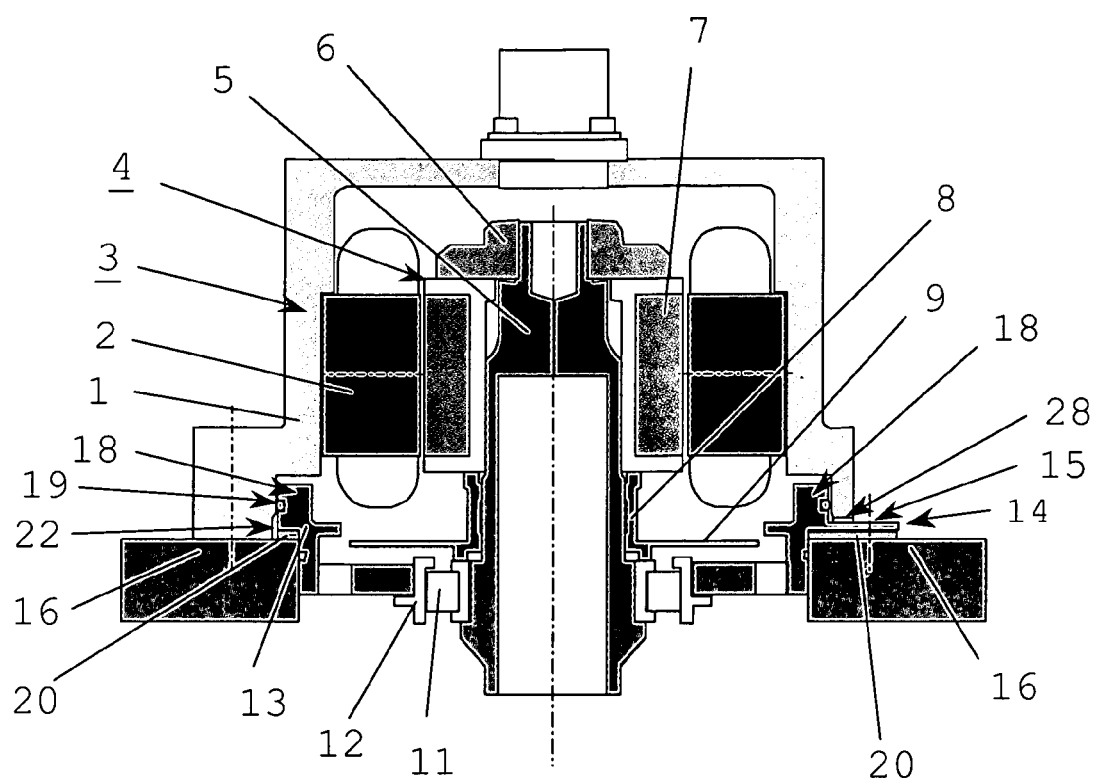
FIG. 7 shows a view of the magneto-electric generator with a heat-conducting ring as an integral part of the generator housing and a radial seal between the generator housing and the bearing retainer ring.

Another embodiment of the cover plate 23 according to the invention is shown in FIG. 7. This embodiment includes the bearing retainer ring 13 but the heat-conducting ring 21 used in the embodiments described above is an integral part of the generator housing 1 and the O-ring 19 is placed between the inner peripheral surface of the generator housing and the outer peripheral surface of the centering cylinder 18 to form a radial seal in this embodiment as well. To be able to slide the generator smoothly onto the centering cylinder 18 without damaging the O-ring 19, the generator housing 1 has a circumferential recess 22 with a greater inner diameter at the upper inner periphery that merges with the inner circumferential cylinder surface of the generator housing 1 in a slide-on bevel. The second spacer ring 20 is dispensable here as well if the embodiment with the adjustable spacer ring 10 for exact position alignment of the rotor 4 with the stator 3 is selected. This would also reduce weight as a more lightweight titanium alloy could replace the thickness of the large-diameter steel spacer ring 20 and the adjustable steel spacer ring 10 has a smaller diameter.

LIST OF REFERENCE SYMBOLS

1. Generator housing
2. Induction coils
3. Stator
4. Rotor
5. Rotor shaft
6. Fastening nut
7. Permanent magnets
8. Jacket
9. Oil splasher disk
10. Adjustable spacer ring
11. Bearing
12. Outer bearing shell
13. Bearing retainer ring
14. Fastening eyes of 13
15. Holes in 14
16. Gearbox casing flange
17. Gearbox casing
18. Centering cylinder of 13
19. O-ring
20. Spacer ring
21. Heat-conducting ring
22. Recess in 1
23. Cover plate (13+21)
24. Mounting links of 21
25. Mounting holes of 24
26. Fastening links of 21
27. Mounting holes of 26
28. Recesses in 21

The invention claimed is:

1. A generator for an engine comprising:
    a generator housing;
    a stator;
    a rotor, the stator and rotor housed in the generator housing;
    a rotor shaft for supporting the rotor;
    a cover plate that is flanged for fitting to a gearbox casing and which includes an integrated bearing for the rotor shaft; the cover plate including:
        a bearing retainer ring detachably connectable to the gearbox casing and made of a rigid high-strength material for receiving the bearing; and
        a separate heat-conducting ring connectable to the gearbox casing and the generator housing and made of a highly heat-conducting material.

2. The generator according to claim 1, wherein the bearing retainer ring includes a centering cylinder molded thereto, the generator housing being fastened to the centering cylinder in centered alignment with the bearing along a peripheral surface.

3. The generator according to claim 2, and further comprising a first spacer ring positioned between the bearing retainer ring and the gearbox casing for adjusting axial alignment of at least one of the centering cylinder with respect to the generator housing and the rotor with respect to the stator the first spacer ring being provided in various thicknesses as needed for the desired axial alignment.

4. The generator according to claim 2, and further comprising an o-ring positioned between the centering cylinder and the generator housing.

5. The generator according to claim 2, wherein the heat-conducting ring encompasses the centering cylinder and includes recesses provided at a side of the heat-conducting ring that abuts the gearbox casing, and the bearing retainer ring includes fastening eyes molded thereon for engaging and mounting to the gearbox casing, the fastening eyes being positioned in the recesses of the centering cylinder.

6. The generator according to claim 1, and further comprising an oil splasher disk including a jacket connected to the rotor shaft; and a second spacer ring positioned on the rotor shaft between the rotor and a front side of the jacket for axial alignment of the rotor with respect to the stator; the second spacer ring being provided in various thicknesses as needed for the desired axial alignment.

7. The generator according to claim 2, wherein the separate heat-conducting ring is connected with an outer peripheral surface of the centering cylinder by way of an interference fit.

8. The generator according to claim 1, and further comprising mounting links molded to an outer circumference of the heat-conducting ring for connecting to the generator housing and the gearbox casing.

9. The generator according to claim 7, and further comprising fastening links molded to the outer circumference of the heat-conducting ring for additionally connecting the heat-conducting ring to the gearbox casing.

10. The generator according to claim 4, wherein the heat-conducting ring is molded in one piece to the generator housing, and in that the generator housing is positioned in centered radial alignment with the bearing retainer ring via the O-ring.

11. The generator according to claim 1, wherein the heat-conducting ring is made of an aluminum alloy and the bearing retainer ring is made of a titanium alloy.

12. The generator according to claim 3, wherein the heat-conducting ring encompasses the centering cylinder and includes recesses provided at a side of the heat-conducting ring that abuts the gearbox casing, and the bearing retainer ring includes fastening eyes molded thereon for engaging and mounting to the gearbox casing, the fastening eyes being positioned in the recesses of the centering cylinder.

13. The generator according to claim 12, and further comprising an oil splasher disk including a jacket connected to the rotor shaft; and a second spacer ring positioned on the rotor shaft between the rotor and a front side of the jacket for axial alignment of the rotor with respect to the stator; the second spacer ring being provided in various thicknesses as needed for the desired axial alignment.

14. The generator according to claim 13, wherein the separate heat-conducting ring is connected with an outer peripheral surface of the centering cylinder by way of an interference fit.

15. The generator according to claim 13, and further comprising mounting links molded to an outer circumference of the heat-conducting ring for connecting to the generator housing and the gearbox casing.

16. The generator according to claim 15, and further comprising fastening links molded to the outer circumference of the heat-conducting ring for additionally connecting the heat-conducting ring to the gearbox casing.

17. The generator according to claim 13, wherein the heat-conducting ring is made of an aluminum alloy and the bearing retainer ring is made of a titanium alloy.

18. The generator according to claim 3, and further comprising an oil splasher disk including a jacket connected to the rotor shaft; and a second spacer ring positioned on the rotor shaft between the rotor and a front side of the jacket for axial alignment of the rotor with respect to the stator; the second spacer ring being provided in various thicknesses as needed for the desired axial alignment.

19. The generator according to claim 16, and further comprising mounting links molded to an outer circumference of the heat-conducting ring for connecting to the generator housing and the gearbox casing.

20. The generator according to claim 18, wherein the heat-conducting ring is made of an aluminum alloy and the bearing retainer ring is made of a titanium alloy.

\* \* \* \* \*